United States Patent Office 3,367,776

Patented Feb. 6, 1968

3,367,776

HEAT SENSITIVE DIAZOTYPE MATERIALS

Edward C. Bialczak, Mount Prospect, and William S. Murphy, Niles, Ill., assignors to Addressograph-Multigraph Corporation, Charles Bruning Division, Mount Prospect, Ill., a corporation of Delaware No Drawing. Filed Apr. 17, 1964, Ser. No. 360,733

8 Claims. (Cl. 96—49)

ABSTRACT OF THE DISCLOSURE

Thermally responsive diazotype photocopying sheet materials wherein the diazotype coating composition contains a light sensitive diazonium salt, an alkaline donor component, an azo coupling component, an acid component and 0.5% to 5% of a stabilizing agent which prevents or inhibits precoupling prior to exposure to light and assists in the formation of dense colored azo dye images which are waterfast, the stabilizing agent being an aminoalkylamide of 2-hydroxy-3-naphthoic acid.

This invention relates to material and methods for making diazotype copies and more particularly to thermally responsive diazotype materials which produce stable and intense azo-dye images and have a good shelf life.

In diazotype reproduction processes it is usual to reproduce a graphic original by placing it in contact with a diazo coated support base such as paper, cloth or film. Exposing the assembly to actinic radiation through the original produces a latent image on the light-sensitive coating. The areas on the coated paper protected by the imaged portions of the graphic original are not exposed and the remaining areas are photochemically decomposed. The exposed paper is then developed by reacting the unexposed diazo compound with an azo-coupling component to form a colored azo-dye image.

Depending on the manner of development, the reproduction process may fall into one of two diazotype reproduction processes namely, the "moist" or "one component" system and the "gas" or "two component" system. In the one component system, the light-sensitive diazo salt is the only active component contained in the coating that is applied to the support base. The latent diazo image is developed by applying a solution containing the azo-coupling component to the exposed sheet. Two component systems have the light-sensitive diazo component and the azo-coupling component contained in the coating. The exposed paper, bearing the latent image, is brought into contact with ammonia fumes which provide the coupling reaction that forms the azo-dye image.

A third system involves the use of heat to produce the coupling reaction. A typical thermally responsive diazotype material is prepared by coating a suitable base support with a sensitizing solution comprising a light sensitizing diazo component, an azo-coupling component, and an alkaline donor component. To make a copy using the material, it is first exposed to actinic radiation in the usual manner. Upon heating the exposed material to a predetermined level the alkaline donor releases the active alkaline fume producing a coupling reaction in the unexposed areas. This results in an azo-dye image. The present invention is concerned with improvements in thermally responsive diazotype materials.

The diazotype processes heretofore available, such as are found in the one and two component systems, left much to be desired in terms of simplicity of operation and convenience. Thermally responsive materials have greatly simplified the copying process by employing less complicated equipment, and also less expensive equipment. The need for liquid developers is eliminated and also the use of obnoxious ammonia vapors used for developing the two component materials.

However, thermal systems have not been without disadvantages. The known materials have a poor shelf life. They are susceptible to degradation at high humidities normally encountered in many areas. The azo-dye images produced are unstable and are known to "run" when they come into contact with water. In the course of handling such prints, one often finds that the ordinary amount of moisture present on one's hands will smear the image and the dye image itself will transfer to the hands.

It is, therefore, a general object of the present invention to provide improved thermally responsive diazotype materials having intense, stable azo-dye images, and a good shelf life.

It is a specific object of the present invention to provide an improved diazotype material capable of being exposed to actinic radiation and developed by exposure to heat producing highly colored waterfast images.

It is a further object of the present invention to provide a thermally responsive diazotype material which is simple to manufacture, having the active components contained in a single coating formulation that can be applied in a conventional manner to conventional base support materials.

A further object is to provide diazotype materials which can be stored for prolonged periods under a variety of humidity conditions without affecting the print density or background of the final copy and which generally produces high quality copies.

An additional object is to provide methods for making reproductions, employing thermally responsive diazotype materials prepared with a single sensitizing solution applied to one surface of a variety of base supports, which diazotype materials are particularly suitable for office and business systems applications where the copy is subjected to repeated handling.

Other objects, features and advantages of the invention will become apparent by reference to the following specification and the specific examples illustrating the best mode of practicing the invention.

It has been found that the addition of minor percentages of a substituted amide of an o-hydroxyaryl carboxylic acid into the coating formula increases the shelf storage life of the thermally responsive diazotype materials and the resulting azo-dye images are substantially waterfast. The desired stabilizing effect upon thermally responsive diazotype material is achieved by adding from 0.5% to 5.0% by weight to the coating formula of an o-hydroxyaryl carboxylic acid corresponding to the following general formula:

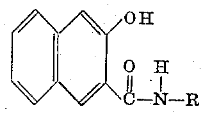

where R is a lower alkyl or a substituted lower alkyl group such as:

$$-(CH_2)_n-N\begin{matrix} R' \\ R'' \end{matrix}$$

$$-(CH_2)_n-O-(CH_2)_n-NH_2$$

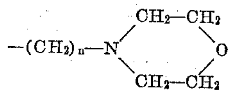

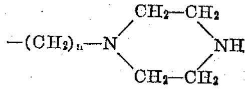

where R′ and R″ represent lower alkyl groups or substituted lower alkyl groups containing from 1–3 carbon atoms and $n$ is an integer from 1–3. The use of such naphthoic acid derivatives as a stabilizing agent has made it possible to correct the tendency of azo-dye to run or bleed when made wet or moistened without sacrificing the intensity of the azo-dye image. This class of compounds also permits the user to leave the thermally responsive diazotype sheets in unsealed packages and stored in varying humidities which heretofore would produce faint washed out images.

In systems applications, as well as in general office copying, the ability of diazotype prints to remain legible and clear without the dye-image smearing under conditions of repeated handling is an important advance in the thermal-diazo art.

It should be noted at this point that the compounds referred to herein as stabilizing agents are well known in the diazo art but only as couplers for both one and two component systems. In the instant invention, still another compound is used as the coupler to react with the diazo sensitizer to produce the azo-dye image. The prior art materials gave excellent azo-dye images on freshly processed coatings. It is not until the addition of the described stabilizing agents that the cited improvements are obtained. The exact nature of the reaction involving the stabilizing agents is not fully understood, however, it is believed that they undergo a molecular addition complex with the coupler.

The hydroxy naphthamide stabilizing agents are simple to use and are readily incorporated in the coating solution without the need for special processing. Naphthamide compounds of the type disclosed herein are soluble up to 5% in water. The same light-sensitive diazo compounds useful in preparing the two component systems, can also be used to advantage in thermally responsive diazotype materials.

Examples of such diazo compounds which are used are the diazonium salts obtained by the diazotization of the following amines:

p-amino-N,N-diethylaniline
p-amino-N-ethylaniline
p-amino-N-ethyl-N-hydroxyethylaniline
p-amino-N-methyl-N-hydroxyethylaniline
p-amino-N,N-di-β-hydroxyethylaniline
p-amino-m-ethoxy-N,N-diethylaniline
p-amino-N-ethyl-o-toluidine
p-amino-N-ethyl-m-toluidine
p-amino-N,N-diethyl-m-toluidine
p-amino-N-ethyl-N-β-hydroxyethyl-m-toluidine
N-p-aminophenylmorpholine
1-amino-2,5-diethoxy-4-morpholinobenzene Typical of the zinc chloride double salts that can be used is 4-morpholine benzene diazonium chlorozincate.

Unlike those of two component system, the couplers which can successfully be used to produce the dye image in thermally responsive materials are limited because they tend to pre-couple; that is, the color formation takes place before the material is imaged and processed. The preferred coupling compound that may be employed to produce the dye image is 2,3-dihydroxynaphthalene-6-sulfonic acid.

Other known couplers may be employed, such as resorcinol, acetoacetanilide, 4-chlororesorcinol, diacetoacetylethylenediamine. However, it has been shown that pre-coupling is a particular problem with many couplers and the shelf life of the coated sheet turns out to be quite poor. Therefore, the right coupler is an important component.

Another component, critical to the development of the dye image, included in the coating formulation is the alkaline donor. Exposure to heat causes the alkaline donor to decompose, releasing ammonia to set off the coupling reaction. Suitable alkaline donor compounds are, for example, urea, substituted alkyl ureas such as methyl urea, ethyl urea, propyl urea, isopropyl urea, butyl urea, pentyl urea, hexyl urea and alkyl substituted guanidines. To advantage, more than one alkaline donor may be employed, such as, urea and ethyl urea.

Other alkaline donors such as thiourea, sulfamides or a substituted derivative thereof by organic radicals or a mixture of two or more of said compounds.

In the presence of the alkaline donors, the diazo salts and the couplers would, in and of themselves, tend to give a color reaction prematurely. To prevent pre-coupling and premature dye formation, there is added an acid component to keep the pH below the level required for coupling. Sulphonic acid derivatives, such as meta-benzene-disulphonic acid is employed as the preferred acid component. Other acids may be used to produce the required pH, such as:

| | |
|---|---|
| maleic acid | oxalic acid |
| malonic acid | citric acid |
| ethanesulfonic acid | tartaric acid |
| benzenesulfonic acid | lactic acid |

In addition to the acid components, there are added heavy metal salts such as the sulphates of zinc and cadmium. The inclusion of the heavy metal salts tends to prevent precoupling of the components at near room temperature.

The use of the acid components to control pH of the coating on the sheet, and the use of heavy metal salts, also help in preventing precoupling, but the diazotype materials failed in other respects. When the user opened a package to use the material and left it for 24 hours to atmosphere, the intensity of the azo-dye image produced fell off sharply. Correction of this difficulty was achieved by adding the stabilizing agents of the instant invention to the coating. The sensitized sheets then could tolerate greater exposure to the atmosphere without having to be resealed in their package.

Surprising results were also realized in the waterfast properties of the resultant dye image produced from the coating containing amide derivatives of 2-hydroxy-3-naphthoic acid.

As a suitable base support there may be used any of the previously known materials for coating diazotype products including ordinary wood pulp papers such as bond papers and sulphite sheets, film bases, such as cellulose acetate, mylar, acetate-butyrate, and the like.

The following examples are intended as illustrative and not to be considered as limiting the invention:

*Example I*

A coating solution was prepared by mixing the following composition:

| | | |
|---|---|---|
| Water | ml | 75.0 |
| Urea | gm | 18.0 |
| m-benzenedisulfonic acid | gm | 2.0 |
| 2,3-dyhydroxynaphthalene-6-sulfonic acid | gm | 3.5 |
| 4-morpholinebenzenediazonium chlorozincate | gm | 2.0 |
| zinc sulfate | gm | 7.0 |
| N-(γ-morpholinopropyl)-3-hydroxy-2-naphthamide | gm | 2.0 |
| Water to make | ml | 100.0 |

Starting with the volume of water indicated, the various components were mixed at room temperature until the solution was clear and free of particulate matter. The solution was applied to a 20 lb. substance paper base support at a rate of about 15 cc. per square yard.

When passed through the heated rollers, which have surface temperature in the range of 150° centigrade to 220° centigrade, the alkaline donor compounds release the alkaline reactive components. The exposed diazotype sheet was separated from the translucent original and then passed between a pair of heated metal rollers which produced an intense blue-green dye image. An image developed in those areas on the diazotype sheet corresponding to the opaque areas of the original.

The quality and intensity of the azo-dye images produced from sheets stored at room temperature and at 60–65% relative humidity in closed packages, so as to be protected from light, gave good results even after three months. Papers prepared without the stabilizing agent and stored under the same conditions exhibited a steady decline in performance until after 30 days the image intensity was noticeably poor. This was particularly noticeable on that portion of the sheets nearest the unsealed end of the package.

The copy papers with the stabilizing agent consistently produced waterfast dye images on both fresh and aged papers.

*Example II*

| | | |
|---|---|---|
| Water | ml | 75.0 |
| Urea | gm | 12.5 |
| Thiourea | gm | 12.5 |
| Citric acid | gm | 1.5 |
| Malonic acid | gm | 1.5 |
| 2,3-dihydroxynaphthalene-6-sulfonic acid | gm | 2.5 |
| 4-morpholinebenzenediazonium chlorozincate | gm | 2.0 |
| Zinc-sulfate | gm | 5.0 |
| N-(γ-morpholinopropyl) - 3 - hydroxy-2-naphthamide | gm | 3.0 |
| Water to make | ml | 100.0 |

The paper of Example II gave somewhat greater improvement in waterfastness and also good shelf life characteristics. The naphthamide compounds having a solubility limit of about 2% did not completely go into solution in the above formula. It was not observed to have interfered with the overall performance of the paper as a thermally responsive sheet. It was noted that as the concentrations of the stabilizing agent increase, the background acquires an off-white shade.

*Example III*

| | | |
|---|---|---|
| Water | ml | 75.0 |
| Urea | gm | 10.0 |
| Ethyl urea | gm | 15.0 |
| m-benzenedisulfonic acid | gm | 4.0 |
| Resorcinol | gm | 2.0 |
| 2,3-hydroxynaphthalene-6-sulfonic acid | gm | 5.0 |
| 4-morpholinebenzenediazonium chlorozincate | gm | 2.0 |
| Cadmium sulphate | gm | 15.0 |
| N-(β-piperazinoethyl) - 3 - hydroxy - 2 - napthamide | gm | 4.5 |
| Water to make | ml | 100.0 |

The formulation of the above example produced a waterfast blackline print. In all respects, it was comparable to the prints produced with the papers of Examples I and II.

*Example IV*

| | | |
|---|---|---|
| Water | ml | 75.0 |
| Urea | gm | 30.0 |
| m-benzenedisulfonic acid | gm | 2.9 |
| 2,3-dihydroxynaphthalene-6-sulfonic acid | gm | 7.0 |
| 4-morpholinebenzenediazonium chlorozincate | gm | 4.5 |
| Zinc sulphate | gm | 18.0 |
| N-[β-(β-aminoethoxy)ethyl] - 3 - hydroxy-2-naphthamide | gm | 0.1 |
| Water to make | ml | 100.0 |

The low percentage of N-[β-(β-aminoethoxy)ethyl]-3-hydroxy-2-naphthamide incorporated in the formula showed a sharp increase in waterfastness of the dye as compared to a diazotype material in which none of the naphthamide was employed. The dye image produced was a blue-line.

*Example V*

| | | |
|---|---|---|
| Water | ml | 75.0 |
| Urea | gm | 22.0 |
| m-benzenedisulfonic acid | gm | 2.9 |
| Resorcinol | gm | 1.5 |
| 2,3-hydroxynaphthalene-6-sulfonic acid | gm | 6.5 |
| 4-morpholinebenzene diazonium chlorozincate | gm | 3.0 |
| Zinc sulphate | gm | 15.5 |
| N-[β-(β-aminoethoxy)ethyl] - 3 - hydroxy-2-naphthamide | gm | 2.5 |
| Water to make | ml | 100.0 |

In the foregoing examples, the naphthamides shown therein may be freely substituted for one another in the various examples without affecting the unique waterfast properties that have been observed.

A coating similar to that of Example I was prepared with the exception that the naphthamide stabilizing agent was omitted from the composition. A print was prepared following the same procedure described above.

Referring to the chart, a comparison of the papers showed that the naphthamide-containing paper was far superior.

A comparison of the waterfastness of the two prints showed that water immersion resulted in solubilizing about 30% of the dye image in the latter as compared to about 5% in the former print.

The quantitative measurements of the waterfastness of the stabilized diazo coating is presented as a function of the percent 2-hydroxy-3-naphthoic acid derivatives incorporated.

| Percent stabilizing agent: | Water fastness (percent dye undissolved) |
|---|---|
| None | 71 |
| 0.3 | 85 |
| 0.6 | 86 |
| 0.9 | 91 |
| 1.2 | 93 |
| 1.5 | 93 |
| 2.0 | 94 |
| 5.0 | 95 |

The testing procedure was carried out on diazotype material prepared in accordance with Example I, except that the coating formulation was varied in the amount of naphthamide included. A length of paper approximately 11″ long was exposed and heat developed. About half of the dye image portion of the strip was dipped several times in tap water at room temperature, each immersion being of 10-second duration. The other portion of the strip, remaining dry, served as a control. Reflectance measurements were taken taken of the water immersed portion and compared to the control portion. The measured reflectance on the immersed portion over the reflectance measurement of the control multiplied by 100 represents the percentage of the image that remained.

Without the incorporation of the stabilizing agent, only 71% of the dye remained on the paper after water immersion, which significantly jumped to about 85% upon the addition of only 0.3% naphthamide. The waterfastness increases steadily as the concentration of the naphthamide is increased in the coating solution. Maximum effect is at about 2.0% level. Addition of up to 5% gave some slight improvement in waterfastness, but at this concentration the background is noticeably off-white in shade.

We claim:

1. A diazotype reproduction material capable of being developed by heat comprising a heat sensitive coating applied to a base support, said coating comprising a mixture of a light sensitive diazonium salt, an alkaline donor component, an azo-coupling component, an acid component and 0.5% to 5% by weight of a stabilizing agent having a general formula:

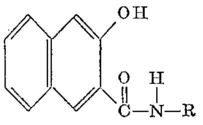

where R is a substituted lower alkyl group selected from the group consisting of:

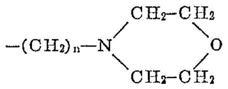

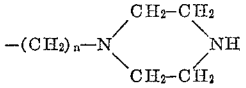

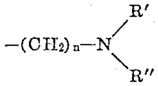

$—(CH_2)_n—O—(CH_2)_n—NH_2$ and R′ and R″ represent lower alkyl groups containing from 1–3 carbon atoms and *n* is an integer from 1–3.

2. The diazotype material described in claim 1 wherein said stabilizing agent is a water soluble derivative of 2-hydroxy 3-naphthoic acid.

3. The diazotype material of claim 1 wherein the water soluble stabilizing agent is:

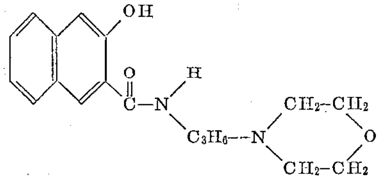

4. The diazotype material of claim 1 wherein the water soluble stabilizing agent is:

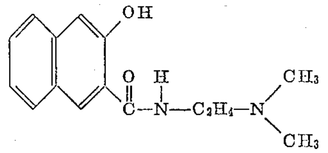

5. The diazotype material of claim 1 wherein the water soluble stabilizing agent is:

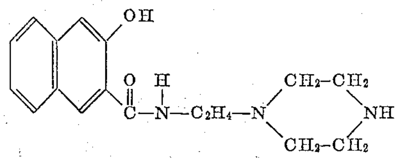

6. The diazotype material of claim 1 wherein the water soluble stabilizing agent is:

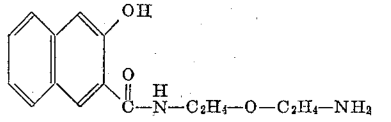

7. The diazotype material of claim 1 wherein the water soluble stabilizing agent is:

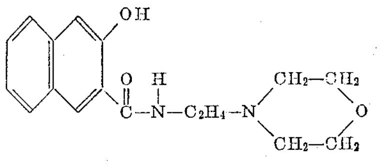

8. The process of making a reproduction of a graphic original comprising the steps of coating a base support with a light sensitive heat responsive coating comprising a light sensitive diazonium salt, an alkaline donor component, an azo-coupling component, an acid component and 0.5% to 5% by weight of a water soluble stabilizing agent having a general formula related from the group consisting of:

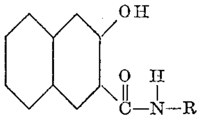

where R is a substituted lower alkyl group selected from the group consisting of:

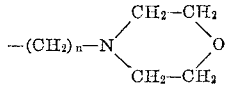

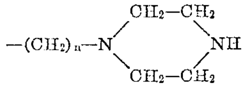

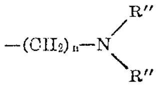

$—(CH_2)_n—O—(CH_2)_n—NH_2$ and R and R″ represent lower alkyl groups containing from 1–3 carbon atoms, and *n* is an integer from 1–3, assembling said graphic original and said coated base support with their surfaces in contiguous relation to one another, directing actinic radiation onto said original, thereafter exposing the coated base support to heat, thereby developing an intense waterfast azo-dye image.

References Cited

UNITED STATES PATENTS

| | | | |
|---|---|---|---|
| 2,233,038 | 2/1941 | Sus et al. | 96—91 |
| 2,653,091 | 9/1953 | Greig | 96—91 X |
| 3,043,827 | 7/1962 | Straley et al. | 260—560 X |
| 3,064,049 | 11/1962 | Cox | 96—91 X |
| 3,079,374 | 2/1963 | Straley et al. | 260—560 X |
| 3,079,375 | 2/1963 | Straley et al. | 260—560 X |
| 3,113,025 | 12/1963 | Bialczak | 96—91 |
| 3,207,748 | 9/1965 | Bossard et al. | 260—560 X |
| 3,255,007 | 6/1966 | Kosar | 96—91 X |
| 3,255,010 | 6/1966 | Sus et al. | 96—91 X |

NORMAN G. TORCHIN, *Primary Examiner.*

C. L. BOWERS, JR., *Assistant Examiner.*

UNITED STATES PATENT OFFICE
CERTIFICATE OF CORRECTION

Patent No. 3,367,776 February 6, 1968

Edward C. Bialczak et al.

It is hereby certified that error appears in the above numbered patent requiring correction and that the said Letters Patent should read as corrected below.

Column 8, lines 18 to 23, the formula should appear as shown below instead of as in the patent:

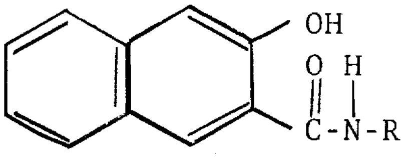

lines 35 to 38, the formula should appear as shown below instead of as in the patent:

$$-(CH_2)n-N\begin{matrix} R' \\ R'' \end{matrix}$$

line 40, for "and R and R''" read -- and R' and R'' --.

Signed and sealed this 22nd day of July 1969.

(SEAL)
Attest:

EDWARD M.FLETCHER,JR.
Attesting Officer

WILLIAM E. SCHUYLER,JR.
Commissioner of Patents